US010472181B1

(12) United States Patent
Eto

(10) Patent No.: US 10,472,181 B1
(45) Date of Patent: Nov. 12, 2019

(54) DISPERSIVE SUPPLY DEVICE AND COMBINATION WEIGHING DEVICE

(71) Applicant: Ishida Co., Ltd., Kyoto (JP)

(72) Inventor: Takao Eto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 21 days.

(21) Appl. No.: 16/065,636

(22) PCT Filed: Dec. 12, 2016

(86) PCT No.: PCT/JP2016/086922
§ 371 (c)(1),
(2) Date: Jun. 22, 2018

(87) PCT Pub. No.: WO2017/110558
PCT Pub. Date: Jun. 29, 2017

(30) Foreign Application Priority Data

Dec. 24, 2015 (JP) ................................. 2015-251154

(51) Int. Cl.
| | |
|---|---|
| *B65G 47/68* | (2006.01) |
| *G01G 19/387* | (2006.01) |
| *B65G 47/46* | (2006.01) |
| *G01G 13/08* | (2006.01) |
| *B65G 33/24* | (2006.01) |

(52) U.S. Cl.
CPC ............ *B65G 47/46* (2013.01); *B65G 33/24* (2013.01); *B65G 47/68* (2013.01); *G01G 13/08* (2013.01); *G01G 19/387* (2013.01)

(58) Field of Classification Search
CPC ........ B65G 47/68; B65G 43/08; B65G 43/00; G01G 19/387; G01G 17/00; G01G 19/393;

(Continued)

(56) References Cited

U.S. PATENT DOCUMENTS

| | | | |
|---|---|---|---|
| 2015/0177052 A1* | 6/2015 | Hofer | G01G 11/003 177/1 |
| 2016/0161135 A1* | 6/2016 | Kikuchi | G01G 19/393 177/245 |

(Continued)

FOREIGN PATENT DOCUMENTS

| | | |
|---|---|---|
| EP | 2484593 A1 | 8/2012 |
| JP | S61-005823 U | 1/1986 |

(Continued)

OTHER PUBLICATIONS

International Search Report issued in PCT/JP2016/086922; dated Feb. 28, 2017.

(Continued)

*Primary Examiner* — James R Bidwell
(74) *Attorney, Agent, or Firm* — Studebaker & Brackett PC

(57) ABSTRACT

A dispersive supply device includes a dispersion portion configured to disperse articles supplied from above toward a periphery, a plurality of conveying portions radially arrayed around the dispersion portion and configured to further convey the articles supplied from the dispersion portion in radial directions, and a plurality of block bodies arranged between the adjacent conveying portions. The block bodies include a first block body configured to restrict the articles supplied from the dispersion portion from entering a portion between the conveying portions, and a second block body configured to allow the articles supplied from the dispersion portion to enter the portion between the conveying portions. The first block body and the second block body are arranged alternately, or at intervals of the block bodies.

4 Claims, 9 Drawing Sheets

(58) Field of Classification Search
CPC ........... B65B 5/08; B65B 35/08; B65B 57/14; B65B 57/20
USPC .......... 198/397.02, 397.01, 397.05; 177/189, 177/245
See application file for complete search history.

(56) References Cited

U.S. PATENT DOCUMENTS

| | | | | |
|---|---|---|---|---|
| 2016/0169732 A1* | 6/2016 | Kishikawa | ........... | G01G 23/005 177/189 |
| 2017/0211967 A1* | 7/2017 | Otoshi | ................. | G01G 19/387 |
| 2018/0029734 A1* | 2/2018 | Kishikawa | .............. | B65B 37/18 |

FOREIGN PATENT DOCUMENTS

| | | |
|---|---|---|
| JP | H06-074932 U | 10/1994 |
| JP | 2002-139371 A | 5/2002 |
| JP | 5102100 B2 | 12/2012 |
| JP | 2014-509290 A | 4/2014 |
| JP | 2014-145742 A | 8/2014 |
| JP | 2014-224709 A | 12/2014 |
| WO | 2012/104404 A1 | 8/2012 |
| WO | 2016117148 * 7/2016 | ........... G01G 19/387 |

OTHER PUBLICATIONS

Written Opinion issued in PCT/JP2016/086922; dated Feb. 28, 2017.

The extended European search report issued by the European Patent Office dated Jul. 4, 2019, which corresponds to European Patent Application No. 16878449.4-1001 and is related to U.S. Appl. No. 16/065,636.

International Preliminary Report on Patentability issued in corresponding International Application No. PCT/JP2016/086922; dated Jul. 5, 2018.

* cited by examiner

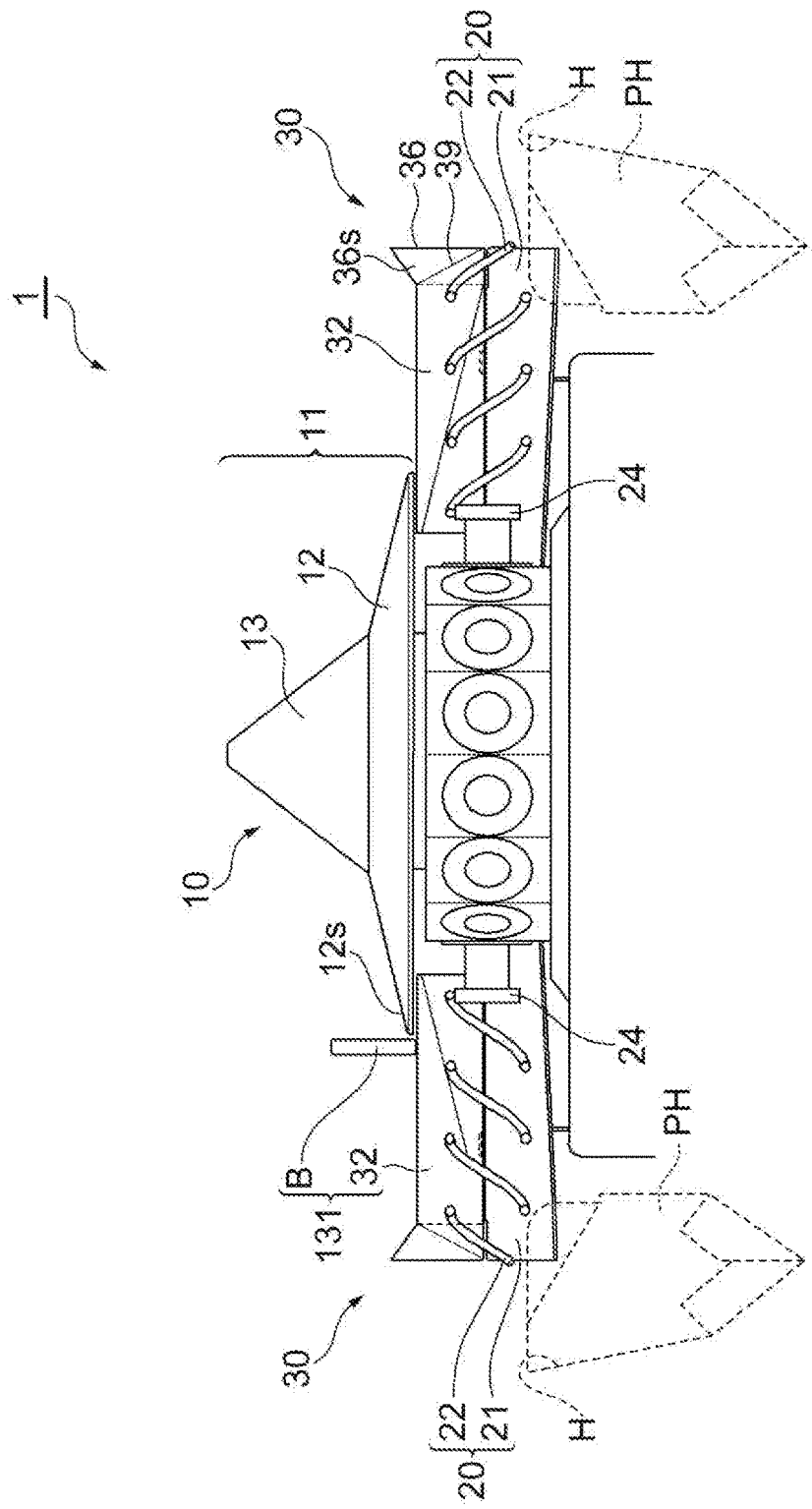

DISPERSIVE SUPPLY DEVICE AND COMBINATION WEIGHING DEVICE

TECHNICAL FIELD

The present disclosure relates to a dispersive supply device and a combination weighing device.

BACKGROUND ART

Combination weighing devices are widely used in various fields as a weighing device that measures off articles having variations in single body mass to a certain amount. Among such articles, when weighing the articles having adhesiveness such as broilers or the like, a combination weighing device disclosed in the following Patent Document 1 is used, for example.

The feature of this combination weighing device is in its dispersive supply device. In the dispersive supply device, a conical dispersion table is arranged in the center and a plurality of screw feeders are radially arrayed around the dispersion table. As the screw feeders are driven, the block meat having adhesiveness is discharged from end portions of the screw feeders by an appropriate amount while being unraveled.

As improved versions thereof, dispersive supply devices for which the number of screw feeders is reduced and for which the interval between the adjacent screw feeders is widened are also developed (see Patent Document 2 and Patent Document 3, for example). In these dispersive supply devices, in order to prevent the block meat from falling from a gap between the respective screw feeders, the gap is covered with a guide block. Moreover, in order to prevent block meat from riding on the guide block, the height of the guide block is higher than an article conveying surface.

CITATION LIST

Patent Literature

Patent Document 1: Japanese Patent No. 5102100
Patent Document 2: Japanese Unexamined Patent Publication No. 2014-145742
Patent Document 3: Japanese Unexamined Patent Publication No. 2014-509290

SUMMARY OF INVENTION

Technical Problem

In the above-described dispersive supply devices, because a front opening of the screw feeder is narrow, when an article longer than the front opening such as meat with bones flows on the dispersion table while being pushed toward the screw feeder side, there has been a case where the article does not flow to the screw feeder and remains on the dispersion table and circles around.

An object of the present disclosure is to provide a dispersive supply device and a combination weighing device capable of reliably feeding articles from a dispersion portion to a conveying portion.

Solution to Problem

A dispersive supply device according to the present disclosure includes a dispersion portion configured to disperse articles supplied from above toward a periphery, a plurality of conveying portions radially arrayed around the dispersion portion and configured to further convey the articles that are supplied from the dispersion portion in radial directions, and a plurality of block bodies arranged between the adjacent conveying portions; and the block bodies include a first block body configured to restrict the articles supplied from the dispersion portion from entering a portion between the conveying portions, and a second block body configured to allow the articles supplied from the dispersion portion to enter the portion between the conveying portions; and the first block body and the second block body are arranged alternately, or at intervals of the block bodies.

The first block body may occupy the portion between the adjacent conveying portions and have a height that restricts the articles supplied from the dispersion portion from entering the portion between the conveying portions, and the second block body may occupy the portion between the adjacent conveying portions and have a height that allows the articles supplied from the dispersion portion to enter the portion between the conveying portions.

The second block body may include an inclined surface that inclines toward the conveying portions on both sides from a ridge along the radial direction, an end portion of the ridge adjacent to the dispersion portion may be arranged on a lower side than an article conveying surface of the dispersion portion, and on a rear portion away from the dispersion portion in the inclined surface, a barrier rising obliquely rearward may be provided.

A combination weighing device according to the present disclosure is a combination weighing device that includes the above-described dispersive supply device at an upper stage and a plurality of hoppers having openings receiving the articles discharged from the dispersive supply device at a lower stage, and an intersection line between the inclined surface and the barrier of the second block body is arranged at a position facing the opening of the hopper.

Effects of Invention

According to the dispersive supply device and the combination weighing device in the present disclosure, it is possible to reliably feed the articles from the dispersion portion to the conveying portions.

BRIEF DESCRIPTION OF DRAWINGS

FIG. 9 is a diagram for explaining a dispersive supply device according to a modification.

DESCRIPTION OF EMBODIMENT

The following describes a dispersive supply device according to an exemplary embodiment, and a combination weighing device equipped with the dispersive supply device, with reference to the accompanying drawings. The following embodiment, however, is not intended to limit the technical scope of the present invention.

Figure 1:
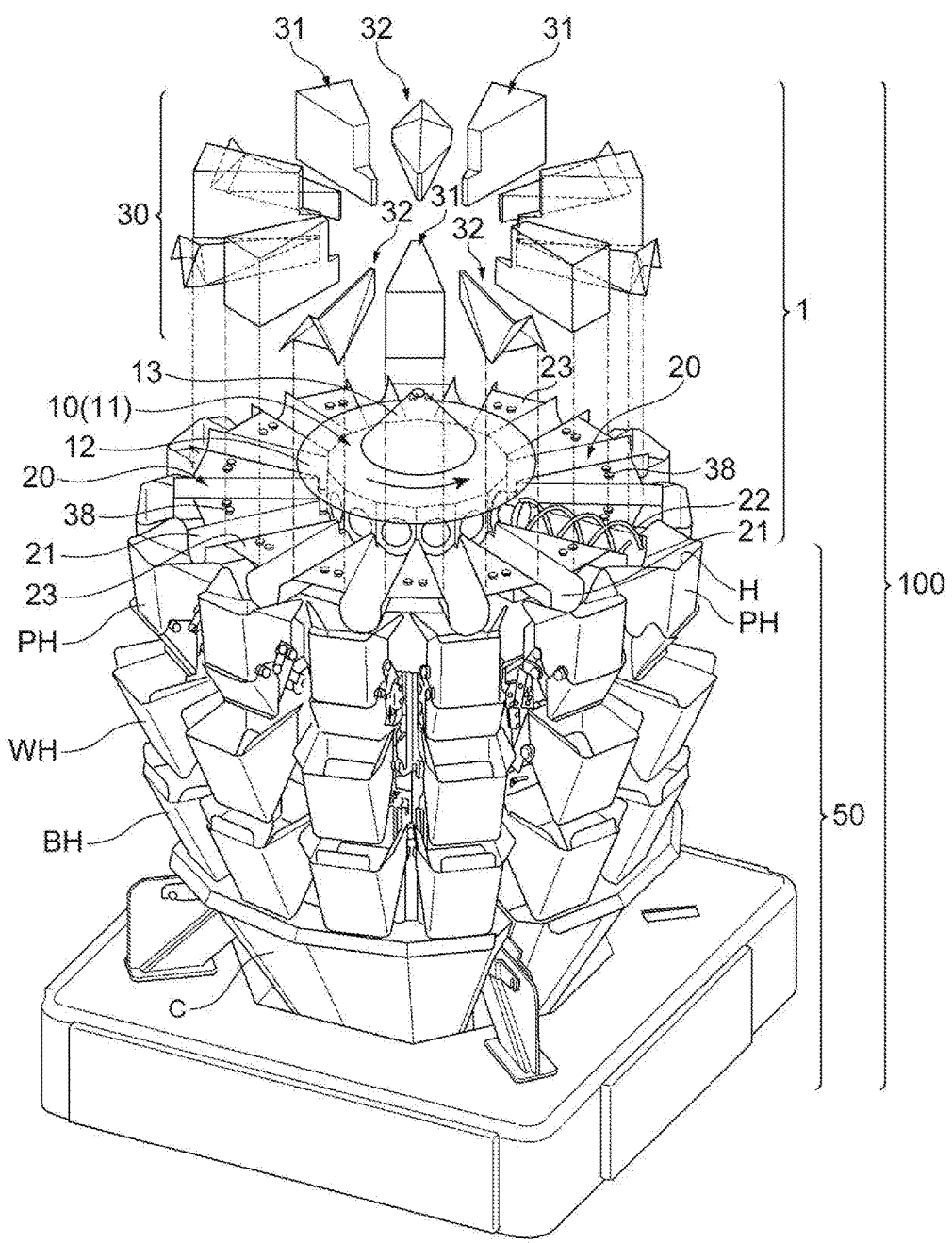
FIG. 1 is an external perspective view of a combination weighing device according to one embodiment.
Figure 2:
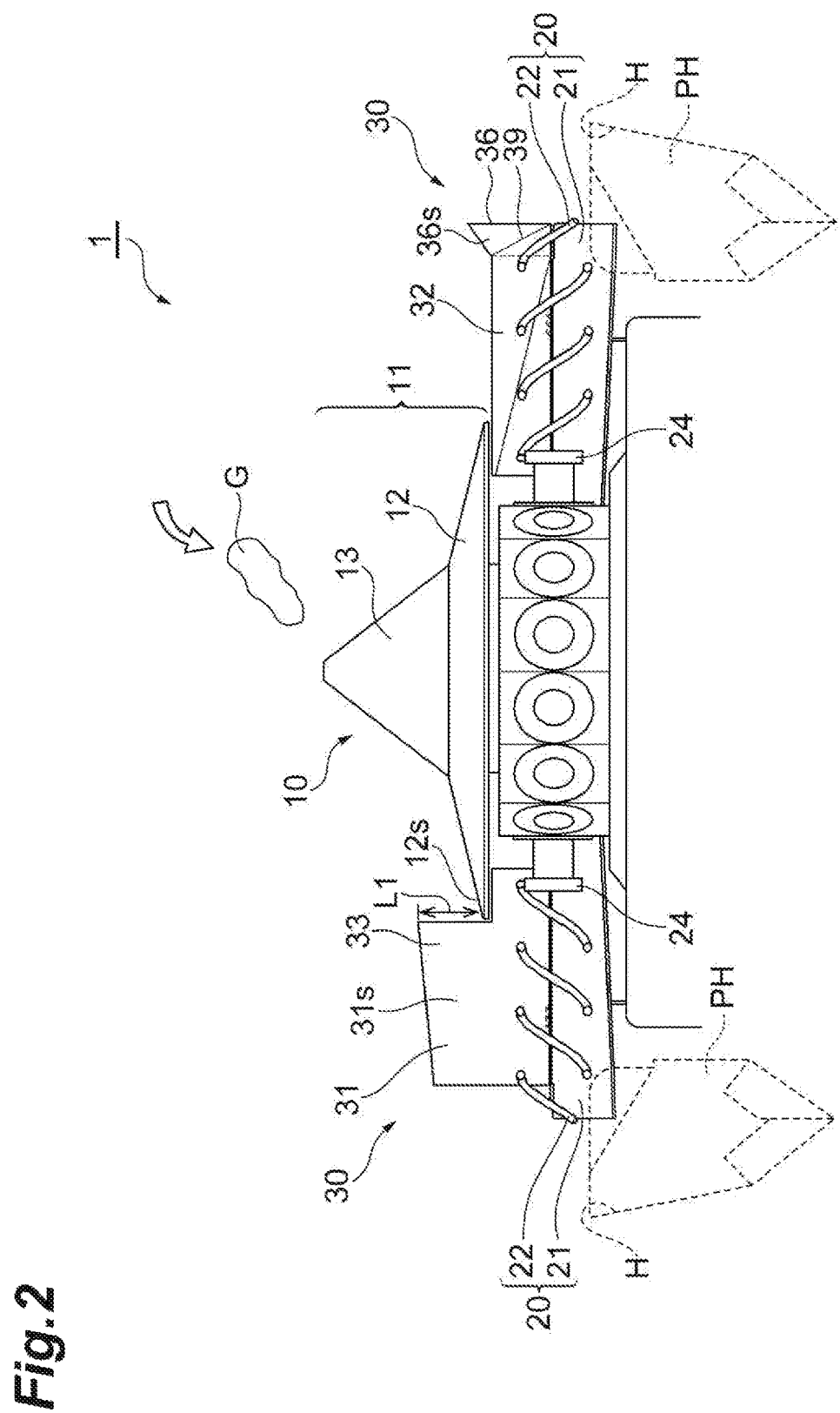
FIG. 2 is a partial cross-sectional side view of a dispersive supply device in the combination weighing device of FIG. 1.

FIG. 1 is an external perspective view of a combination weighing device 100 according to one embodiment. FIG. 2 is a partial cross-sectional side view of a dispersive supply device 1 in the combination weighing device 100. As illustrated in FIG. 1, the combination weighing device 100 is a weighing device that measures off articles G having variations in single body mass to a certain amount. The dispersive supply device 1 disperses the articles G supplied from above toward the periphery and supplies the articles G to the combination weighing device 100. The articles G are, for example, food having adhesiveness such as broilers or the like. The dispersive supply device 1 includes a dispersion portion 10 provided in the center, a plurality of conveying portions 20 radially arrayed around the dispersion portion 10, triangular plates 23 provided between the adjacent conveying portions 20, and block bodies 30 that are attached to the triangular plates 23.

As illustrated in FIGS. 1 and 2, the dispersion portion 10 disperses the articles G supplied from above toward the periphery. The dispersion portion 10 is formed of a stainless-steel material, as one example. The dispersion portion 10 includes a dispersion table 11 configured to disperse the articles G thrown in from above toward the periphery and a non-depicted motor that rotates the dispersion table 11 around a vertical axis in an arrow direction. The dispersion table 11 has a shape in which a conical portion 13 having an acute vertex angle is coaxially overlapped at the center of a conical portion 12 having an obtuse vertex angle. The diameter of the conical portion 12 is larger than the diameter of the conical portion 13. The surfaces of the conical portion 12 and the conical portion 13 are embossed. On the surfaces of the conical portion 12 and the conical portion 13, the articles G are hard to adhere. Accordingly, the articles G thrown in from above the dispersion table 11 are conveyed on an article conveying surface 12s by the rotation of the dispersion table 11 while hitting on the conical portion 13 and being dispersed, and the articles G are further supplied toward the conveying portions 20 of the periphery. The article conveying surface 12s is an upper surface of the peripheral edge portion of the conical portion 12.

The conveying portion 20 further conveys the articles G supplied from the dispersion portion 10 in the radial direction. The conveying portion 20 is a screw feeder provided at the position that is one step lower than the dispersion table 11, as one example. This screw feeder includes a trough 21 for which a transverse cross-section that intersects the radial direction is U-shaped, and a screw 22 that rotates in the trough 21. The rotational axis of the screw 22 is arranged in the longitudinal direction of the trough 21. In the example of FIG. 1, although the screw 22 is depicted only at one place, each trough 21 is provided with the screw 22.

In the example of FIG. 1, although fourteen troughs 21 are radially arrayed around the dispersion portion 10, the number and the arrangement of the troughs 21 are not limited thereto. The number and the arrangement of the troughs 21 may be changed as appropriate depending on the number and the arrangement of pool hoppers (hoppers) PH which will be described later. In addition, the respective troughs 21 are integrally coupled via the triangular plates 23 between the adjacent troughs 21. Accordingly, all the troughs 21 are integrated to a donut shape in planar view. In this case, in a state in which the dispersion table 11 is removed, all the troughs 21 are integrally pulled out upward.

Figure 3:
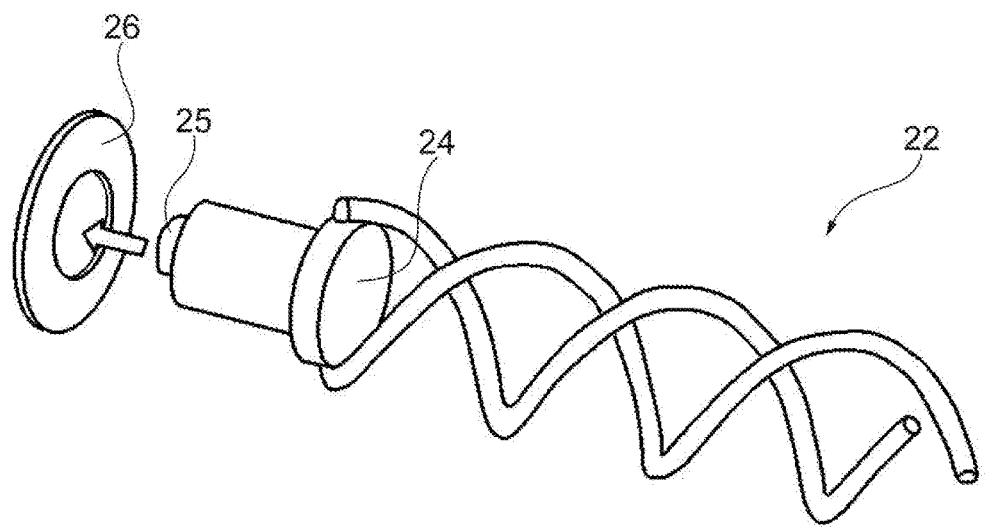
FIG. 3 is an external perspective view of a screw of a conveying portion of FIG. 2.

FIG. 3 is an external perspective view of the screw of the conveying portion 20. As illustrated in FIGS. 2 and 3, the screw 22 includes two metal rods that are bent in a spiral shape. The two rods are fixed to the circumferential edge of a disc body 24 with a phase difference of 180 degrees. On the base portion of the disc body 24, a coupling 25 of a screw-in type is provided. The coupling 25 is screwed into a coupling of a drive shaft not depicted in a flange 26, thereby being coupled to the drive shaft. Accordingly, the screw 22 supported by the drive shaft rotates in one direction in a state of floating a certain distance from the trough 21.

As illustrated in FIGS. 1 and 2, on the triangular plates 23 that bridge between the respective troughs 21, the block bodies 30 for which the bottom surface is of the same shape are arranged so as to occupy portions between the adjacent conveying portions 20. Each of the block bodies 30 is constituted by first block bodies 31 configured to restrict the articles G supplied from the dispersion table 11 from entering a portion between the conveying portions 20, and second block bodies 32 configured to allow the articles G supplied from the dispersion table 11 to enter the portion between the conveying portions 20. In the example of FIG. 1, although the block bodies 30 are depicted above the dispersion portion 10, the block bodies 30 are lowered along the dashed-dotted line and are attached onto the triangular plates 23.

Figure 4:
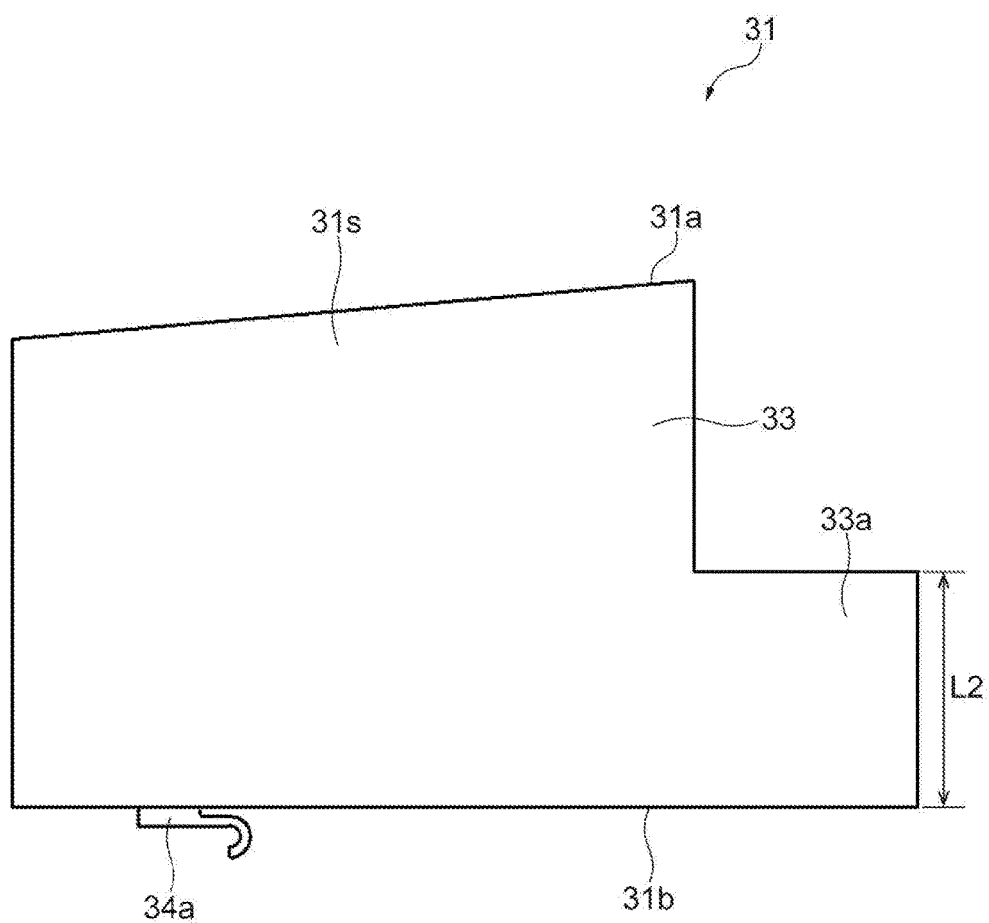
FIG. 4 is a side view of a first block body.
Figure 5:
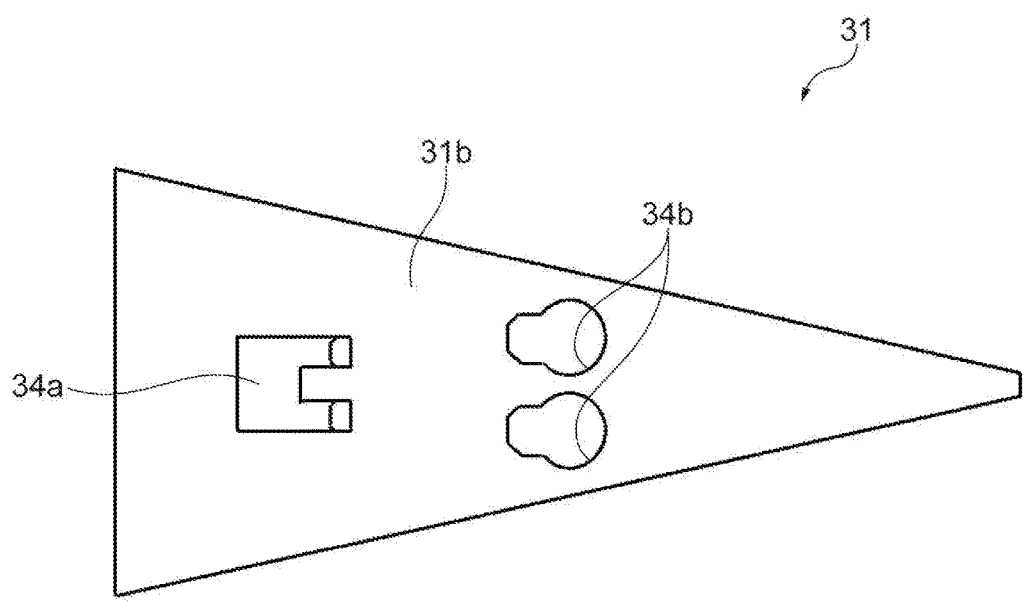
FIG. 5 is a bottom view of the first block body of FIG. 4.

FIG. 4 is a side view of the first block body 31. FIG. 5 is a bottom view of the first block body 31. As illustrated in FIGS. 2, 4, and 5, the first block body 31 is formed into a substantially triangular prism having an upper surface 31a and a bottom surface 31b, as one example. The bottom surface 31b has an outer shape of the same size as that of the triangular plate 23. Then, an end portion 33 adjacent to the dispersion table 11, at the position adjacent to the circumferential edge of the conical portion 12, is cut out in an L-shape in side view (see FIG. 2). A height L1 from the upper surface 31a to the article conveying surface 12s of the conical portion 12 is set to a sufficient height such that no articles G supplied from the dispersion table 11 are able to ride on the upper surface 31a of the end portion 33. This height L1 may be determined as appropriate depending on the deposition amount of the articles G in the dispersion portion 10. The height of an end portion 33a that is one step lower than the upper surface 31a is set to a height L2 at which the end portion 33a can get into the underside of the conical portion 12. Accordingly, the articles G fell into the trough 21 from the circumferential edge of the conical portion 12 are reliably caught by the screw 22 without getting under the conical portion 12. Furthermore, on the bottom surface 31b of the same shape as that of the triangular plate 23, a hook 34a for fixing the first block body 31 to the triangular plate 23 is attached. Moreover, as illustrated in FIG. 5, on the bottom surface 31b, two through holes 34b are provided side by side.

The first block body 31 includes an extending portion 31s that extends toward the upper side than the article conveying surface 12s of the dispersion portion 10. The extending portion 31s extends up to the upper surface 31a on the upper side than the article conveying surface 12s. The extending portion 31s extends at the height L1 configured to restrict the articles G from entering a portion between the conveying portions 20. The height that restricts the articles G from entering the portion between the conveying portions 20 is a height at which the articles G that were deposited on the dispersion portion 10 are not able to ride on the first block body 31. In the first block body 31, when the articles G are supplied from the dispersion table 11, by hitting on the end portion 33 (the extending portion 31s), the articles G are pushed back to the dispersion table 11. That is, the extending portion 31s functions as a restriction portion that restricts the articles G supplied from the dispersion table 11 from entering the portion between the conveying portions 20.

Figure 6:
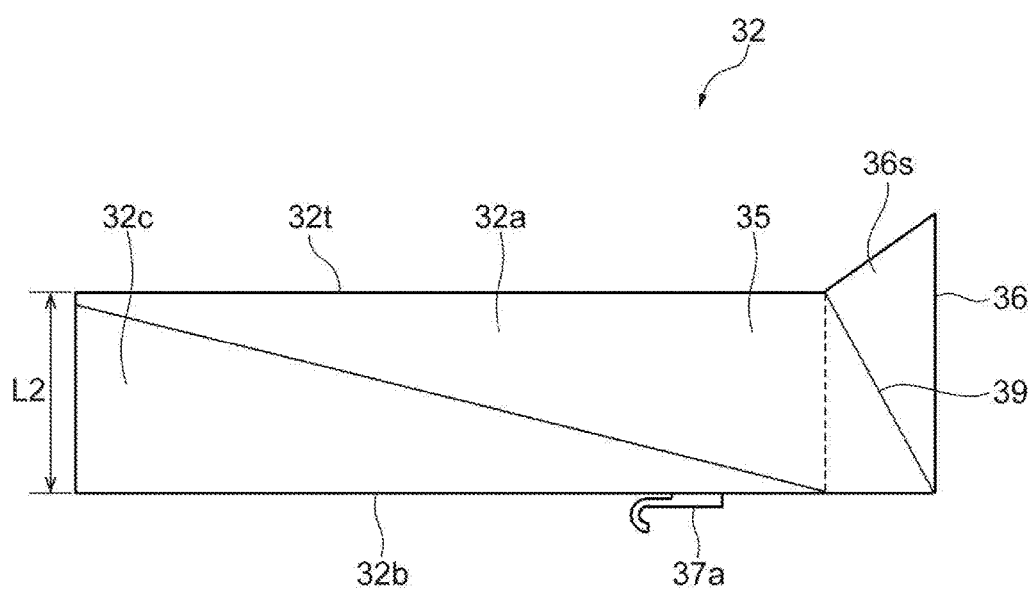
FIG. 6 is a side view of a second block body.
Figure 7:
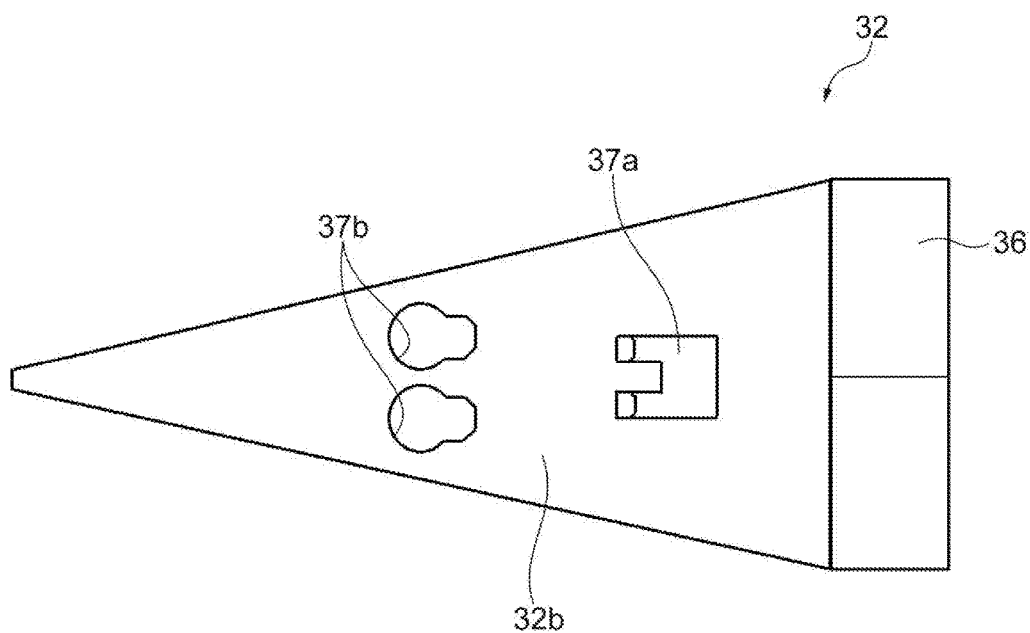
FIG. 7 is a bottom view of the second block body of FIG. 6.

FIG. 6 is a side view of the second block body 32. FIG. 7 is a bottom view of the second block body 32. As illustrated in FIGS. 2, 6, and 7, the second block body 32 is formed into a substantially triangular pyramid shape, as one example. An upper surface 32a of the second block body 32 is formed into an inclined surface like a gable roof, for example. The height of an end portion 32c of the second block body 32 is set to the height L2 at which a ridge 32t of the gable roof can get into the underside of the conical portion 12 when the second block body 32 is arranged on the triangular plate 23. The upper surface 32a forms an inclined surface 35 that inclines from the ridge 32t toward the conveying portions 20 on both sides (the direction intersecting with the radial direction). On the rear portion on the side opposite to the end portion 32c of the inclined surface 35, a barrier 36 that rises obliquely rearward is provided. The rearward means a direction of being away from the dispersion portion 10. Accordingly, the articles G that reached the rear portion are forcibly dropped to the adjacent conveying portion 20 side. Furthermore, on a bottom surface 32b of the same shape as that of the triangular plate 23, a hook 37a the same as the hook 34a for fixing the second block body 32 to the triangular plate 23 is attached. Moreover, as illustrated in FIG. 7, two through holes 37b of the same shape as the through hole 34b are provided side by side.

Consequently, the first block body 31 and the second block body 32 can be attached to any of the triangular plates 23. In the example of FIG. 1, although it illustrates an example in which the first block bodies 31 and the second block bodies 32 are arranged alternately, the embodiment is not limited thereto. For example, the second block bodies 32 of at least two or more may be arranged between a pair of the first block bodies 31, or conversely, the first block bodies 31 of at last two or more may be arranged between a pair of the second block bodies 32. The first block body 31 and the second block body 32 may be arranged at intervals of the block bodies. Being arranged alternately or at intervals of the block bodies is a concept that includes a case where a single first block body 31 and a single second block body 32 are arranged alternately, a case where the second block bodies 32 of at least two or more are arranged between a pair of the first block bodies 31, a case where the first block bodies 31 of at least two or more are arranged between a pair of the second block bodies 32, and a case where a plurality of second block bodies 32 are arranged for each plurality of first block bodies 31.

When attaching these first block bodies 31 and the second block bodies 32 to the triangular plates 23, after inserting rivet-like pins 38 that are provided side by side on the triangular plate 23 into large diameter portions of the through holes 34b or 37b, the first block body 31 and the second block body 32 are made to slide toward the dispersion portion 10 side. Then, the heads of the pins 38 are fitted into small diameter portions of the through holes 34b or 37b, thereby preventing the upward disengagement.

Figure 8:
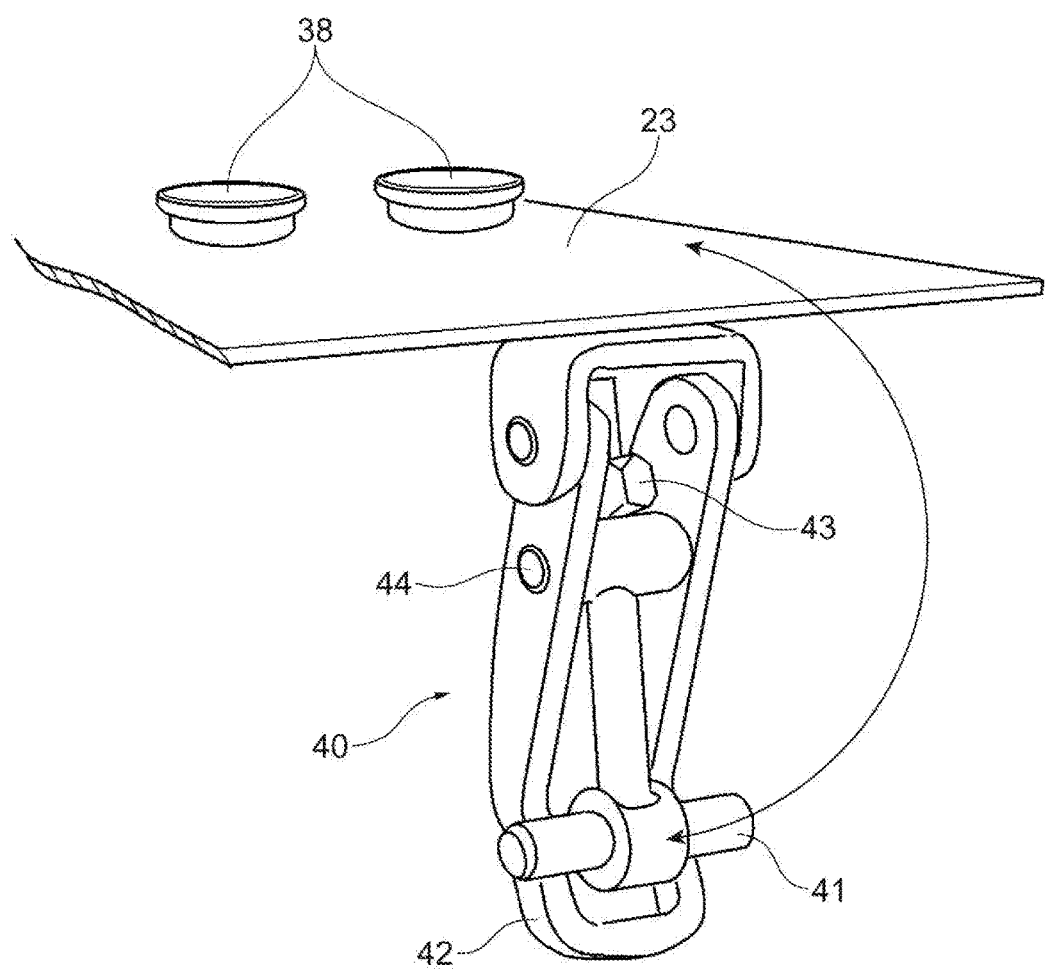
FIG. 8 is an external perspective view of a toggle mechanism that fixes the block body.

Meanwhile, as illustrated in FIG. 8, on the lower surface of the triangular plate 23, a toggle mechanism 40 is attached. By pulling a lever 42 downward after raising a T-shaped member 41 of the toggle mechanism 40 and hooking it to the hook 34a or 37a of the first block body 31 and the second block body 32, because the T-shaped member 41 pulls the hook 34a or 37a downward, the first block body 31 and the second block body 32 are pressed and fixed onto the triangular plate 23. The T-shaped member 41 is configured to be adjustable to extend and shrink centering a rotating shaft 44 by turning a nut 43 at the upper end portion. By this adjustment, the distance to the hook 34a or 37a to be hooked can be adjusted.

The second block body 32 is lower in height than the first block body 31. The height of the second block body 32 is set to the height L2, as one example. The height L2 is a height that allows the articles G to enter the portion between the conveying portions 20 when the second block body 32 is arranged on the triangular plate 23. The height that allows the articles G to enter the portion between the conveying portions 20 is a height at which the articles G that are on the dispersion portion 10 are able to ride on the second block body 32. Specifically, when the article conveying surface 12s of the circumferential edge of the dispersion portion 10 is taken as a reference, the height of the second block body 32 arranged on the triangular plate 23 is at substantially the same level as the article conveying surface 12s or at a level slightly lower than the article conveying surface 12s. Furthermore, the height of the second block body 32 of a case in which, even when the end portion 32c of the second block body 32 is somewhat higher than the article conveying surface 12s, the articles G are able to climb over the end portion 32c easily is included in the height that allows the articles G to enter the portion between the conveying portions 20.

The barrier 36 includes a guide surface 36s that intersects in the radial direction. Accordingly, the articles G that rode on the ridge 32t of the second block body 32, shinned along the ridge 32t, and reached the rear portion of the second block body 32 are guided by the guide surface 36s and forcibly dropped off to the adjacent conveying portion 20 on either side.

In the dispersive supply device 1 thus configured, the dispersion portion 10 includes the conical dispersion table 11, and a motor that rotates the dispersion table 11 around the vertical axis in the arrow direction. Thus, when the articles G are thrown in from above the dispersion table 11, the articles G are conveyed toward the circumferential edge of the dispersion table 11 by the rotation of the dispersion table 11. The conveying portion 20 is a screw feeder provided at the position that is one step lower than the article conveying surface 12s of the circumferential edge of the dispersion portion 10. This screw feeder includes the trough 21 for which a transverse cross-section that intersects the radial direction is U-shaped, and the screw 22 that rotates in the trough 21. The rotational axis of the screw 22 is arranged in the longitudinal direction of the trough 21. Accordingly, when the articles G are supplied into the conveying portion 20, by the rotation of the screw 22, the articles G are conveyed toward the end portion of the trough 21 while being unraveled.

When the articles G hit on the end portion 33 (the extending portion 31s) of the first block body 31, the articles G are pushed back to the dispersion table 11. However, in the second block body 32, there is no such push-back. Thus, even when the articles G are of relatively long food such as meat with bones for example, the articles G climb over the second block body 32 and are supplied toward the adjacent conveying portion 20. More specifically, when the length of the articles G supplied from the dispersion portion 10 is smaller than the front opening of the conveying portion 20, the articles G flow toward the conveying portion 20 without any difficulty. Meanwhile, because the height of the second block body 32 is set to the height that allows the articles G to enter the portion between the conveying portions 20, when the length of the articles G is larger than the front opening of the conveying portion 20, the articles G tumble down on the second block body 32, and flow toward the adjacent conveying portions 20.

Accordingly, it is possible to prevent the articles G, which are longer than the front opening of the conveying portion 20, from not flowing toward the conveying portions 20 and remaining on the dispersion table 11. The front opening of the conveying portion 20 is a separation distance between the adjacent block bodies 30 interposing the relevant conveying portion 20. The article G for which the length is longer than the front opening of the conveying portion 20 means an article for which the length in the longitudinal direction of the article G is larger than the front opening of the conveying portion 20.

As in the foregoing, in the dispersive supply device 1, the block bodies 30 arranged between the adjacent conveying portions 20 include the first block bodies 31 configured to restrict the articles G supplied from the dispersion portion 10 from entering the portion between the conveying portions 20, and the second block bodies 32 configured to allow the articles G supplied from the dispersion portion 10 to enter the portion between the conveying portions 20. The first block bodies 31 and the second block bodies 32 are arranged alternately, or at intervals of the block bodies. Accordingly, when the length of the articles G supplied from the dispersion portion 10 is smaller than the front opening of the conveying portion 20, the articles G flow toward the conveying portion 20 without any difficulty. Meanwhile, when the length of the articles G is larger than the front opening of the conveying portion 20, because the articles G are allowed to enter the portion between the conveying portions 20 by the second block body 32, the articles G ride on the second block body 32, and flow toward the conveying portion 20. Accordingly, it is possible to prevent the articles G, which are longer than the front opening of the conveying portion 20, from not flowing toward the conveying portions 20 and remaining on the dispersion portion 10. As a result, it is possible to reliably feed the articles G from the dispersion portion 10 to the conveying portions 20.

In the dispersive supply device 1, the first block body 31 occupies the portion between the adjacent conveying portions 20 and has the height that restricts the articles G supplied from the dispersion portion 10 from entering the portion between the conveying portions 20, and the second block body 32 occupies the portion between the conveying portions 20 and has the height that allows the articles G supplied from the dispersion portion 10 to enter the portion between the conveying portions 20. Accordingly, the first block body 31 itself can restrict the articles G supplied from the dispersion portion 10 from entering the portion between the conveying portions 20.

In the dispersive supply device 1, the second block body 32 includes the inclined surface 35 that inclines toward the conveying portions 20 on both sides from the ridge 32t lying along the radial direction. The end portion 32c of the ridge 32t adjacent to the dispersion portion 10 is arranged on the lower side than the article conveying surface 12s of the dispersion portion 10. On the rear portion away from the dispersion portion 10 in the inclined surface 35, the barrier 36 that rises obliquely rearward is provided. Accordingly, the articles G supplied from the dispersion portion 10 ride on the ridge 32t of the second block body 32. Then, the articles G that shinned along the ridge 32t and reached the rear portion of the second block body 32 (the side opposite to the dispersion portion 10 in the inclined surface 35) are guided by the barrier 36 and forcibly dropped off to the adjacent conveying portion 20 on either side. Thus, the articles G that rode on the second block body 32 are reliably dropped off to the conveying portion 20.

Next, the combination weighing device 100 will be described. As illustrated in FIG. 1, the combination weighing device 100 includes the dispersive supply device 1 that is arranged at an upper stage, and a hopper unit 50 that is arranged at a lower stage. The hopper unit 50 includes pool hoppers PH that temporarily store therein the articles G discharged from the conveying portions 20, weighing hoppers WH that receive and weigh the articles G discharged from the pool hoppers PH, booster hoppers BH that temporarily store therein and combine the weighed articles G discharged from the weighing hoppers WH, and collecting chutes C arranged at a lower stage of the foregoing. The pool hopper PH includes an opening H that receives the articles G conveyed by the dispersive supply device 1. The collecting chute C collects the articles G of a certain amount discharged from the booster hopper BH, or the articles G of a certain amount simultaneously discharged from the weighing hopper WH and the booster hopper BH. However, the combination weighing device 100 to which the dispersive supply device 1 can be installed may be a combination weighing device of a type that uses no booster hoppers BH, or may be a combination weighing device of a type that uses the booster hoppers BH and that, by using a weighing hopper WH capable of discharging the articles G in two directions, switches directions of discharging from the weighing hopper WH to the booster hopper BH or from the weighing hopper WH to the collecting chute C.

Because the above-described hopper unit 50 is well known, the detailed descriptions of the respective portions of the hopper unit 50 will be omitted. As illustrated in FIG. 2, in the combination weighing device 100, in particular, an intersection line 39 between the inclined surface 35 and the barrier 36 of the second block body 32 is arranged at a position facing the opening H of the pool hopper PH. Accordingly, even when the articles G shinned along the ridge 32t of the second block body 32 and reached the barrier 36, because the articles G fall along a virtual line extending the intersection line 39, the articles G are reliably received by the pool hopper PH.

In using the combination weighing device 100, the first block bodies 31 and the second block bodies 32 are arranged alternately and mounted on the triangular plates 23, for example. In a state that the combination weighing device 100 is driven, when the articles G are thrown in on the dispersion portion 10, the articles G are supplied to the conveying portions 20 by the rotation of the dispersion table 11. When the articles G hit on the end portion 33 of the first block body 31, the articles G are pushed back to the dispersion table 11. Meanwhile, in the second block body 32, there is no such push-back. Thus, even when the articles G are of relatively long articles such as meat with bones for example, the articles G climb over the second block body 32 and are supplied toward the adjacent conveying portions 20. Accordingly, it is possible to prevent the articles G, which are longer than the front opening of the conveying portion 20, from not flowing toward the conveying portions 20 and remaining on the dispersion table 11.

Meanwhile, when the articles G are discharged in sequence from the booster hoppers BH, the weighing hoppers WH, and the pool hoppers PH at the lower stage, which have been selected by the combination weighing, the screws 22 of the conveying portions 20 corresponding to the emptied pool hoppers PH rotate for a certain time. Along with this, the articles G supplied to the conveying portions 20 are supplied toward the pool hopper PH side. At the end, the articles G are discharged from the conveying portions 20 and supplied to the pool hoppers PH.

As in the foregoing, the combination weighing device 100 is provided with the above-described dispersive supply device 1 at the upper stage and is provided with a plurality of pool hoppers PH having the openings H that receive the articles G discharged from the dispersive supply device 1 at the lower stage. Accordingly, because the above-described dispersive supply device 1 is provided, it is possible to prevent the articles G that are longer than the front opening of the conveying portion 20 from not flowing toward the conveying portions 20 and remaining on the dispersion table 11 and circling around. As a result, it is possible to reliably feed the articles G from the dispersion portion 10 to the conveying portions 20.

In the combination weighing device 100, on the side opposite to the dispersion portion 10 in the inclined surface 35, the barrier 36 that rises obliquely rearward is arranged. The intersection line 39 between the inclined surface 35 and the barrier 36 of the second block body 32 is arranged at a position facing the opening H of the pool hopper PH. Accordingly, even when the articles G shinned along the ridge 32t of the second block body 32 and reached the barrier 36, because the articles G are dropped off along the virtual line extending the intersection line 39 toward the opening H of the pool hopper PH, the articles G are reliably received by the pool hopper PH. Such a combination weighing device 100 has a high usefulness as a weighing device that handles foods such as broilers in particular.

As in the foregoing, one embodiment of the present disclosure has been explained. The present invention, however, is not limited thereto, and other modes can also be employed.

For example, in the above-described embodiment, as a first block body, the first block body 31 that has the height that restricts the articles G supplied from the dispersion portion 10 from entering the portion between the conveying portions has been exemplified. However, the embodiment is not limited thereto. For example, as illustrated in FIG. 9, in place of the first block body 31, a first block body 131 that includes the second block body 32, and a rod-like member B attached to the ridge 32t of the end portion of the relevant second block body 32 may be used. In the first block body 131, the rod-like member B prevents the articles G from riding on the second block body 32. Accordingly, the articles G hit on the rod-like member B are pushed back to the dispersion table 11. Meanwhile, the articles G ride on the second block body 32 to which the rod-like member B is not attached at the ridge 32t. Thus, even when the articles G are of long food such as meat with bones for example, it is possible to reliably supply the articles G to the conveying portions 20. That is, by providing the rod-like member B separate from the second block body 32 (the block body 30), the first block body 131 restricts the articles G supplied from the dispersion portion 10 from entering the portion between the conveying portions. Even in this case, it is possible to reliably feed the articles G from the dispersion portion 10 to the conveying portions 20.

In the above-described embodiment, although it has been described that the height of the ridge 32t of the second block body 32 is constant, the ridge 32t may be inclined such that the height of the ridge 32t of the second block body 32 increases gradually toward the rear portion (the pool hopper PH side) from the dispersion portion 10 side. Accordingly, the articles G rode on the second block body 32 can be dropped off to the adjacent conveying portions 20 more reliably.

In the above-described embodiment, although it has been described that the upper surface 31a of the first block body 31 is a flat surface, the upper surface 31a may be an inclined surface. Although it has been described that the lateral surface of the first block body 31 is a vertical surface, it may be in a shape like a gable roof that inclines toward the conveying portions 20 on both sides from the ridge along the radial direction, for example. In this case, in order to prevent the articles G from riding on the ridge, the end portion 33 adjacent to the dispersion portion 10 may have a height that restricts the articles G from entering the portion between the conveying portions 20. Alternatively, a barrier having the height that restricts the articles G from entering the portion between the conveying portions 20 may be provided at the end portion 33.

At least a part of the above-described embodiment or modifications may be combined in any desired manner.

A dispersive supply device according to one aspect includes a dispersion portion configured to disperse articles supplied from above toward a periphery, a plurality of conveying portions radially arrayed around the dispersion portion and configured to further convey the articles that are supplied from the dispersion portion in a radial direction, and a plurality of block bodies occupying portions between the adjacent conveying portions, and the block bodies include a first block body of a height not allowing the articles supplied from the dispersion portion to enter the portion between the conveying portions and a second block body of a height allowing the articles supplied from the dispersion portion to enter the portion between the conveying portions, and the first block body and the second block body are arranged alternately, or at intervals of the block bodies.

In the dispersive supply device in one aspect, the second block body includes an inclined surface that inclines toward the conveying portions on both sides from a ridge along the radial direction, an end portion of the ridge adjacent to the dispersion portion is arranged on a lower side than an article conveying surface of the dispersion portion, and on a rear portion away from the dispersion portion in the inclined surface, a barrier rising obliquely rearward is provided.

A combination weighing device according to one aspect is a combination weighing device that includes the above-described dispersive supply device at an upper stage and a plurality of hoppers that receive articles discharged from the dispersive supply device at a lower stage, and an intersection line between the inclined surface and the barrier of the second block body is arranged at a position facing the upside of the hopper.

In the combination weighing device and the combination weighing device in one aspect, the height not allowing the articles to enter the portion between the conveying portions means a height at which the articles deposited on the dispersion portion are not able to ride on the first block body, and inversely, the height allowing the articles to enter the portion between the conveying portions means a height at which the articles on the dispersion portion are able to ride on the second block body. Specifically, when the article conveying surface of the circumferential edge of the dispersion portion is taken as a reference, the height of the second block body is at substantially the same level as the article conveying surface or at a level slightly lower than the article conveying surface. Furthermore, even if the end portion of the second block body is somewhat higher than the foregoing article conveying surface, when the articles are able to climb over the end portion easily, that level is also included.

In addition, being arranged alternately, or at intervals of the block bodies is a concept that includes a case where the first block body and the second block body are arranged alternately, a case where the second block bodies of at least two or more are arranged between the first block bodies, or inversely, a case where the first block bodies of at least two or more are arranged between the second block bodies, and furthermore, a case where a plurality of second block bodies are arranged for each plurality of first block bodies.

In the combination weighing device and the combination weighing device in one aspect, in the first block body, the upper surface may be a flat surface or an inclined surface, and the lateral surface may be a vertical surface. In place of this, it may be of a shape like a gable roof that inclines toward the conveying portions on both sides from the ridge along the radial direction. In this case, in order to prevent the articles from riding on the ridge, the height of the end portion on the side that comes in contact with the dispersion portion is kept sufficiently high. Alternatively, a barrier of a sufficient height may be provided at the end portion thereof.

In the combination weighing device and the combination weighing device in one aspect, the second block body is of a shape like a gable roof that inclines toward the conveying portions on both sides from the ridge along the radial direction. Then, the end portion of the ridge adjacent to the dispersion portion is arranged on the lower side than the article conveying surface of the dispersion portion. In addition, the barrier that rises obliquely rearward is provided on the inclined surface of the rear portion away from the dispersion portion, so that the articles that reached the rear portion are dropped off to the adjacent conveying portions. Accordingly, it is possible to prevent the articles from falling from between the conveying portions.

In the combination weighing device and the combination weighing device in one aspect, the dispersion portion may include the dispersion table of a conical shape, and a drive mechanism that vibrates or drives the dispersion table. When the articles are supplied to the dispersion portion from above, the articles are conveyed toward the circumferential edge by the vibration or the rotation of the dispersion portion. The conveying portion is a screw feeder provided at the position that is one step lower than the circumferential edge of the dispersion portion. This screw feeder may include the trough for which a transverse cross-section is U-shaped, and the screw that is arranged and rotates in the trough. The rotational axis of the screw is arranged along the groove of the trough. Then, when the articles are supplied in the conveying portion, by the rotation of the screw, the articles are conveyed toward the end portion of the trough while being unraveled.

Accordingly, when the articles supplied from the dispersion portion are smaller than the front opening of the conveying portion, the articles flow toward the conveying portion without any difficulty. The articles that are longer than the front opening of the conveying portion straddle between the first block body and the second block body. Because the height of the second block body is low, the long articles tumble down on the second block body, and flow toward the adjacent conveying portions. Accordingly, it is suppressed that the articles of long sizes remain on the dispersion portion for a long time.

The combination weighing device according to one aspect includes the foregoing dispersive supply device at the upper stage, and a plurality of hoppers configured to receive articles discharged from the dispersive supply device at the lower stage, and the intersection line between the inclined surface and the barrier of the second block body is arranged at a position facing the upside of the hopper. Accordingly, the articles held back by the barrier reliably fall onto the hopper.

According to the dispersive supply device in one aspect, the first block body of the height not allowing the articles supplied from the dispersion portion to enter the portion between the conveying portions and the second block body of the height allowing the articles to enter the portion between the conveying portions are provided, and thus, even when the articles longer than the front opening the portion between the conveying portions are supplied from the dispersion portion, the articles ride on the second block body and flow toward the conveying portions. Accordingly, it is suppressed that the articles of long sizes remain on the dispersion portion for a long time.

According to the combination weighing device in one aspect, the barrier provided at the rear end portion of the second block body is arranged at a position facing the upside of the hopper, and thus, even when the articles shinned along the second block body and are supplied to the position where the hopper is present, the articles are reliably discharged to the hopper by the barrier. Accordingly, it has usefulness as a weighing device that handles foods such as broilers in particular.

INDUSTRIAL APPLICABILITY

According to the dispersive supply device and the combination weighing device in the present disclosure, it is possible to reliably feed the articles G from the dispersion portion to the conveying portions.

REFERENCE SIGNS LIST

1 DISPERSIVE SUPPLY DEVICE
10 DISPERSION PORTION
20 CONVEYING PORTION
30 BLOCK BODY
31 FIRST BLOCK BODY
32 SECOND BLOCK BODY
35 INCLINED SURFACE
36 BARRIER
39 INTERSECTION LINE
PH POOL HOPPER (HOPPER)
100 COMBINATION WEIGHING DEVICE

The invention claimed is:
1. A dispersive supply device comprising:
   a dispersion portion configured to disperse articles supplied from above toward a periphery;
   a plurality of conveying portions radially arrayed around the dispersion portion and configured to further convey the articles supplied from the dispersion portion in radial directions; and
   a plurality of block bodies arranged between the adjacent conveying portions, wherein
   the block bodies include
      a first block body configured to restrict the articles supplied from the dispersion portion from entering a portion between the conveying portions, and
      a second block body configured to allow the articles supplied from the dispersion portion to enter the portion between the conveying portions, and
   the first block body and the second block body are arranged alternately, or at intervals of the block bodies.

2. The dispersive supply device according to claim 1, wherein the first block body occupies the portion between the adjacent conveying portions and has a height that restricts the articles supplied from the dispersion portion from entering the portion between the conveying portions, and the second block body occupies the portion between the adjacent conveying portions and has a height that allows the articles supplied from the dispersion portion to enter the portion between the conveying portions.

3. The dispersive supply device according to claim 2, wherein the second block body includes an inclined surface that inclines toward the conveying portions on both sides from a ridge along the radial direction, an end portion of the ridge adjacent to the dispersion portion is arranged on a lower side than an article conveying surface of the dispersion portion, and on a rear portion away from the dispersion portion in the inclined surface, a barrier rising obliquely rearward is provided.

4. A combination weighing device comprising:

the dispersive supply device according to claim 3 at an upper stage; and a plurality of hoppers having openings receiving the articles discharged from the dispersive supply device at a lower stage, wherein an intersection line between the inclined surface and the barrier of the second block body is arranged at a position facing the opening of the hopper.

* * * * *